United States Patent
Hollman et al.

(10) Patent No.: US 8,917,436 B2
(45) Date of Patent: Dec. 23, 2014

(54) PIEZOCHROMIC DEVICE

(75) Inventors: Aaron Hollman, Hebron, KY (US); Russell Schwartz, Cincinnati, OH (US); David Kozak, Fairfield, OH (US)

(73) Assignee: Sun Chemical Corporation, Parsippany, NJ (US)

( * ) Notice: Subject to any disclaimer, the term of this patent is extended or adjusted under 35 U.S.C. 154(b) by 26 days.

(21) Appl. No.: 13/503,243

(22) PCT Filed: Oct. 21, 2010

(86) PCT No.: PCT/US2010/053474
§ 371 (c)(1),
(2), (4) Date: May 24, 2012

(87) PCT Pub. No.: WO2011/050128
PCT Pub. Date: Apr. 28, 2011

(65) Prior Publication Data
US 2012/0229881 A1 Sep. 13, 2012

Related U.S. Application Data

(60) Provisional application No. 61/253,533, filed on Oct. 21, 2009.

(51) Int. Cl.
*G02F 1/03* (2006.01)
*G02F 1/17* (2006.01)
*G02F 1/09* (2006.01)

(52) U.S. Cl.
CPC .......... *G02F 1/178* (2013.01); *G02F 2001/094* (2013.01)
USPC .......................................... 359/245; 359/253

(58) Field of Classification Search
USPC ................................................ 359/245, 253
See application file for complete search history.

(56) References Cited

U.S. PATENT DOCUMENTS

| 8,211,224 B2 | 7/2012 | Hollman et al. |
| 8,211,225 B2 | 7/2012 | Hollman et al. |
| 8,409,342 B2 | 4/2013 | Hollman et al. |

FOREIGN PATENT DOCUMENTS

| GB | 1468768 | 3/1977 |
| JP | H 05-143006 | 6/1993 |
| JP | H 06-118452 | 4/1994 |
| JP | H 11-15413 | 1/1999 |
| JP | 2009-128970 | 6/2009 |
| WO | WO 03/061980 A1 | 7/2003 |
| WO | WO 2005/114316 A1 | 12/2005 |
| WO | WO 2008-156948 | 12/2008 |
| WO | WO 2009/126437 A1 | 10/2009 |
| WO | WO 2010/115803 A2 | 10/2010 |
| WO | WO 2010/115928 | 10/2010 |

OTHER PUBLICATIONS

International Search Report and Written Opinion dated Dec. 28, 2010 for Application No. PCT/US2010/053474.

(Continued)

*Primary Examiner* — Jack Dinh
(74) *Attorney, Agent, or Firm* — Frost Brown Todd LLC

(57) ABSTRACT

The current invention relates to a piezochromic device wherein said device exhibits a reversible change in appearance initialed by an external applied force and then reverts back to its original appearance over a set relaxation time when the external force is removed. In one embodiment, a device comprising a transparent or semi-transparent cover layer and a magnetic layer, wherein between the cover layer and the magnetic layer is a liquid medium containing magnetically alignable pigments.

14 Claims, 2 Drawing Sheets

Note: the two layers of magnetic sheet are actually touching each other, with the spacer layer being "sandwiched", as there is an adhesive layer holding them together and the magnetic sheet is very flexible.

(56) References Cited

OTHER PUBLICATIONS

International Preliminary Report on Patentability dated Apr. 24, 2012 for Application No. PCT/US2010/053474.

Chinese Office Action, Notification of the First Office Action, dated Apr. 1, 2014 for Chinese Application No. 201080047761.2 with English Translation.

Japanese Office Action, Notice of Reasons for Rejection, dated Apr. 15, 2014 for Japanese Application No. JP 2012-535354 with English Translation.

English Translation of Japanese Patent No. JP H 06-118452.

English Transaltion of Japanese Patent No. JP H 05-143006.

English Translation of Japanese Patent No. JP H 11-15413.

English Translation of Japanese Patent No. JP 2009-128970.

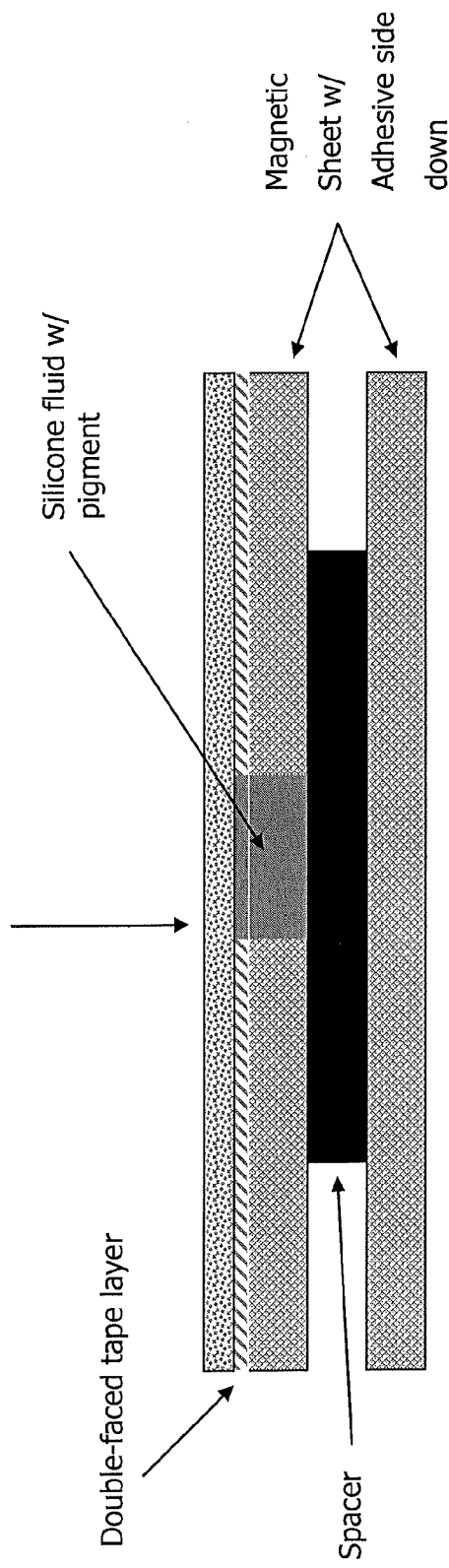

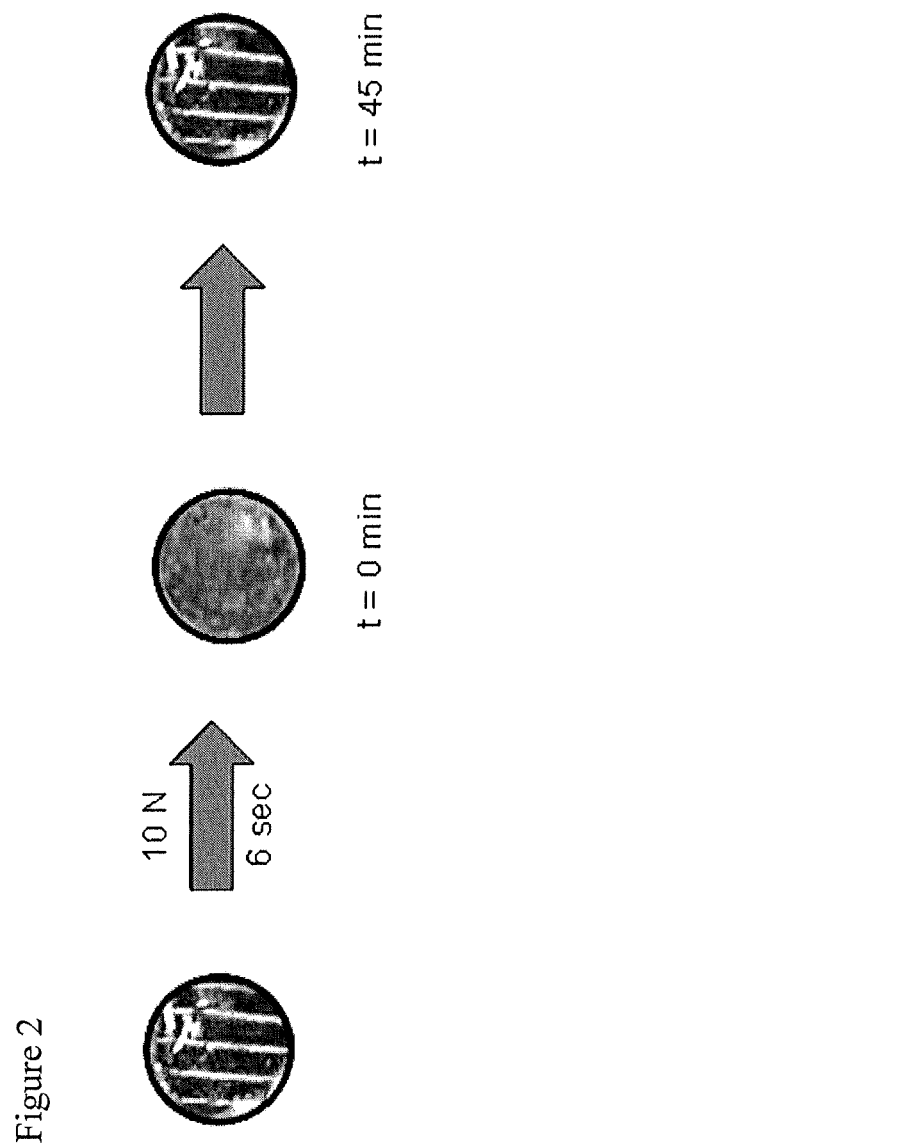

PIEZOCHROMIC DEVICE

CROSS REFERENCE TO RELATED APPLICATIONS

The present application is a national stage application of PCT/US2010/053474, filed Oct. 21, 2010, which claims the benefit of the provisional patent application of the same title, Ser. No. 61/253,533, filed on Oct. 21, 2009, both of which are hereby incorporated by reference in their entirety.

BRIEF SUMMARY

A piezochromic device wherein the device exhibits a reversible change in appearance initiated by an external applied force and then reverts back to its original appearance over a set relaxation time when the external force is removed.

In one embodiment, a device comprising a transparent or semi-transparent cover layer and a magnetic layer, wherein between the cover layer and the magnetic layer is a liquid medium containing magnetically alignable pigments.

These and other objects and advantages shall be made apparent from the accompanying drawings and the description thereof.

BRIEF DESCRIPTION OF THE FIGURES

The accompanying drawings, which are incorporated in and constitute a part of this specification, illustrate embodiments, and together with the general description given above, and the detailed description of the embodiments given below, serve to explain the principles of the present disclosure.

FIG. 1 is a schematic representation (cross sectional view) of the piezochromic device produced in Example 1.

FIG. 2 is a piezochromic response of the device produced in Example 1.

DETAILED DESCRIPTION

One embodiment of a piezochromic device comprising a transparent or semi-transparent cover layer and a magnetic layer, wherein between the cover layer and the magnetic layer is a liquid medium containing magnetically alignable pigments. In one embodiment, a backing layer is between the liquid medium and the magnetic layer.

Magnetically alignable pigments have different appearance depending upon their orientation and are magnetically susceptible. A variety of magnetically alignable pigments, alone or in combination, in the form of particles or flakes can be used. Examples include noninterference based pigments such as monolithic metallic flakes comprised of iron, nickel, cobalt, alloys thereof, stainless steel and like materials. Furthermore, noninterference based pigments containing a layer of magnetically susceptible material can be utilized. In addition, interference based pigments such as multilayer thin film flakes containing magnetically susceptible layers can also be used. For example, multi-colored, lustrous platelet-like pearlescent pigments containing magnetically susceptible layers such as those described in U.S. Publications 2008/0110372 and 2009/0255442 (which are hereby incorporated by reference in their entirety), can be used. In addition, pigment flakes that have dramatic color travel (chroma and hue) with changes in the angle of incident light or viewing angle can be used. Color shifting effects can increase the three dimensional-like effects created within the liquid medium of the present invention. Organic and/or inorganic pigments and dyes may also be blended with the magnetically alignable pigments to create a custom color or appearance. In one embodiment the magnetically alignable pigments may comprise a layer of paramagnetic, diamagnetic, or permanently magnetic material. In one embodiment, examples of magnetically alignable pigments include iron oxide or titanium oxide coated mica pigments. Examples of magnetically alignable pigments include SunGEM® pigment product codes 290-7203, -7242, -7253, -7263, -7402 and SunPRIZMA® pigment product codes C90-7201, -7241, -7251, -7261, -7401. The magnetic mass susceptibility of the pigment may be in the range of about $0.1*10^{-5}$ m$^3$/kg to about $60*10^{-5}$ m$^3$/kg, or about $1.8*10^{-5}$ m$^3$/kg to about $10*10^{-5}$ m$^3$/kg.

In one embodiment magnetically alignable pigments are aspherical, such as needles, flakes, or platelet, or platelet-like. Thus, when the magnetically alignable pigments are subjected to a magnetic field, they tend to orient with their longest dimension in alignment with the field lines and may be subjected to a change of orientation that leads to a change in the appearance of the liquid medium.

In one embodiment the quantity of magnetically alignable pigments in the liquid medium may be sufficient as to visually see a difference in the appearance of the liquid medium in the equilibrium state and following application of an external force.

Magnetically alignable pigments may be prepared by a variety of processes. Pigment flakes may be formed by a web coating process in which layers, at least one layer containing magnetically susceptible material, are sequentially added to a web material by conventional deposition approaches. In another approach, magnetically alignable pigments or particles can be coated using a sequential encapsulation process. Examples of thin film deposition processes include physical vapor deposition, chemical vapor deposition, plasma enhanced vapor or physical deposition, sputtering, electrolyses deposition and other like methods of forming thin magnetically susceptible layers.

The appearance of the device depends upon the orientation of the magnetically alignable pigments. In one embodiment the liquid medium is viscous enough that the magnetically alignable pigments will not reorient without an externally applied force. Examples of the force are mechanical pressure or magnetic force. Application of pressure in a direction normal or tangential (shear) to the surface of the device may disturb the liquid medium and the magnetically alignable pigments to change the appearance of the device. The magnetically alignable pigments may be altered from a state of equilibrium to a state of disorder by the applied force. Upon removal of the pressure, the magnetic layer will cause the pigments to revert back to their magnetically aligned state. Different devices may respond differently to the magnitude of the applied force and the duration for which it is applied. In one embodiment the device may not alter its appearance until a certain threshold of pressure is met.

In one embodiment the magnetic force may be used to return the orientation of the magnetically alignable pigments to an equilibrium position. The magnetic force may be created by the magnetic layer.

The liquid medium used in the device depends upon the desired application. Silicone oils, such as polydimethylsiloxane, may be useful for the device because they can be prepared at a wide range of viscosities and the viscosity is relatively stable with temperature. This allows for uniform device characteristics (relaxation time, etc.) over a wide range of temperatures. Examples of other liquids that may be used as the liquid medium include hydrocarbon or mineral oils, poly-alpha-olefins (PAO's), polyol esters, glycols, and glycerols. The liquid medium may be a mixture of liquids.

The thickness of the liquid medium may be from about 5 to about 100 mils, or from about 10 to about 50 mils thick. The thickness of the liquid medium need not be the same thickness in all parts of the device.

The viscosity of the liquid medium influences the pressure required to disturb the equilibrium state and the relaxation time. Higher viscosities generally require higher applied external forces to induce the change in appearance of the liquid medium. In addition, higher viscosities generally translate to longer relaxation times. Thus, it would be possible to customize the viscosity such that the device would only change appearance at a specific range of external force. In one embodiment the viscosity may range from about 50 to about 1,000,000 P (poise), or about 50,000 to about 200,000 P. The liquid medium may be sealed so that the pressure increases during activation or it may be unsealed so that air may escape. The latter embodiment enables activation with less force.

The relaxation time (the time necessary to return the magnetically alignable pigments to their equilibrium position) is also greatly influenced by the magnetic strength of the magnetic layer, the magnetic susceptibility of the magnetically alignable pigments, and the distance between the magnetic layer and the pigments. Higher magnetic strength or magnetic susceptibility results in faster relaxation times. However, these two factors have very little influence on the pressure required to disturb the equilibrium state. Therefore, devices with well controlled behavior (both the pressure required to disturb the equilibrium state and the relaxation time) can be created by careful manipulation of the strength of the magnetic field, the magnetic susceptibility of the magnetic pigments and the viscosity of the liquid medium. The relaxation time may be about 1 second to 15 seconds, about 15 seconds to about 30 seconds, about 1 minute, about 5 minutes, about 10 minutes, about 15 minutes, about 30 minutes, about 1 hour, about 2 hours, about 3 hours, about 4 hours, about 5 hours, about 10 hours, about 12 hours, or about 1 day. The relaxation time may be any time between these examples, or even beyond.

Three dimensional images can be achieved in cured coatings, inks and plastics using pigments characterized by high magnetic susceptibility. In such applications the pigments are preferentially aligned by exposing uncured inks or paints to a magnetic field. This allows for controlled manipulation of the pigment orientation that can be utilized to produce three-dimensional images with interesting depth. Following the establishment of the desired pigment orientation, the coating is then cured solidifying the image in place.

In one embodiment of the device, the mechanism of magnetic alignment will be used in an uncured liquid medium containing magnetically alignable pigments. The liquid medium is enclosed within the device and the device comprises at least one transparent or semi-transparent face and magnetic material.

The transparent or semi-transparent face allows for visual inspection of the liquid medium contained within the device. It may comprise of a wide variety of organic, for example, optically transparent or semi-transparent polymeric materials; or inorganic materials, for example, glass. Examples include polyethylene, polypropylene, polycarbonate, polyester, Teflon FEP, PVC (polyvinyl chloride), acrylics, polystyrene, and PETG (amorphous copolyester). The transparent or semi-transparent face may be made from a mixture of polymers.

The transparent or semi-transparent face may only account for a small portion of the overall device. It is manly intended to allow for visual inspection of the liquid medium to see a change in its appearance upon application of external force and subsequent removal of the external force.

In general, magnetic materials are opaque to light. So the magnetic material may be positioned within the device so as not to completely obstruct the view of the liquid medium. The magnetic material may be flexible or rigid and of any conventional composition.

Magnetic materials may comprise a dispersion of magnetic particles in a natural or synthetic resin binder. The magnetic material may be manufactured by dispersing the magnetic particles in an uncured or unhardened state of the resin binder then forming the mixture into a sheet or other appropriate shape of magnetic article and curing or hardening the binder. For example, the magnetic particles may be dispersed in an uncured rubber or plasticized resin in a high-shear mixer then be extruded, usually at elevated temperature, through a suitably shaped die or nozzle to form a sheet material. The sheet may be used as extruded, i.e., uncured, or may be cured by incorporating a curing or vulcanizing agent into the mixture or by cooling to about room temperature. When prepared by extrusion, calendaring or the like, the magnetic layer may have a thickness, for example, of from about 0.25 mm to about 25.4 mm, about 0.3 mm to about 20 mm, about 0.38 mm to about 12.7 mm, but a greater or lesser thickness is also possible depending on end-use application. It is also possible to prepare the magnetic layer by forming a dispersion of a particulate magnetic material and a resin binder therefore in a volatile vehicle. The dispersion may then be coated onto a flexible substrate to a desired thickness, and the volatile vehicle evaporated leaving a layer comprising the particulate magnetic material dispersed in the resin binder. After formation of the layer of magnetic particles in a resin binder, the layer may be magnetized by conventional procedures, e.g., by passing the layer over a multipole magnetizer. The magnetic layer may comprise from about 40% to about 92% by weight, about 55% to about 92% by weight, or about 75% to about 92% by weight, of a magnetic particulate material and about 8% to about 60% of a binder, about 8% to about 40% of a binder, or about 8% to about 25% of a binder.

The magnetic material may be any material that can be incorporated into a magnetic coating in sufficient amount and permanently magnetized to a sufficient magnetic strength to achieve a magnetic layer that is self-adherent to a magnetically attractant surface. Suitable magnetic materials include any magnetizable magnetic particles conventionally used in flexible or rigid magnetic layers. Accordingly, magnetic materials having a high magnetization and high coercivity, such as strontium and barium ferrites, alloys with a base of aluminum, nickel, and cobalt (ALNICO), rare earth magnetic materials, such as those incorporating neodymium, iron, boron and the like, can be used. See Table 1 for properties of common rigid magnetic materials.

In one embodiment, the magnetic layer may comprise an electromagnet.

TABLE 1

Properties of common magnetic materials.

| Material | Grade | Density (g/cc) | Residual Induction (Gauss) | Coercive Force (Oersteds) | Intrinsic Coercive Force (Oersteds) | Curie Temp. (° C.) | Max. Operating Temp. (° C.) |
|---|---|---|---|---|---|---|---|
| Neodymium | 27SH | 7.4 | 10800 | 9800 | 20000 | 300 | 300 |
| | 30H | 7.4 | 11000 | 10500 | 17000 | 300 | 300 |
| | 35 | 7.4 | 12300 | 10500 | >12000 | 280 | 280 |
| | 40 | 7.4 | 12900 | 10500 | >12000 | 280 | 280 |
| | 45 | 7.4 | 13500 | 11000 | >12000 | 280 | 280 |
| Ceramic (Strontium and iron oxide) | 1 | 4.9 | 2300 | 1860 | 3250 | 450 | 204 |
| | 5 | 4.9 | 3800 | 2400 | 2500 | 450 | 204 |
| | 8 | 4.9 | 3850 | 2950 | 3050 | 450 | 204 |
| Alnico (cast) | 5 | 7.3 | 12800 | 640 | 640 | 860 | 525 |
| | 8 | 7.3 | 8200 | 1650 | 1860 | 860 | 550 |
| Alnico (sintered) | 5 | 6.9 | 10900 | 620 | 630 | 860 | 525 |
| | 8 | 7.0 | 7400 | 1500 | 1690 | 860 | 550 |
| Samarium-Cobalt | 18 | 8.2 | 8700 | 8000 | 20000 | 750 | 250 |
| | 20 | 8.2 | 9000 | 8500 | 15000 | 750 | 250 |
| | 24 | 8.4 | 10200 | 9200 | 18000 | 825 | 300 |
| | 26 | 8.4 | 10500 | 9000 | 11000 | 825 | 300 |

The magnetic material may be adjacent to the liquid medium or may be separated by a spacer layer, or a backing layer. The distance between the magnetic material and the liquid medium can be used to manipulate the strength of the magnetic field and therefore can be used to manipulate the relaxation time.

Specific patterns, images, or logos may be created within the liquid medium by the magnetic layer. In one embodiment permanent magnets may be used as the magnetic layer. The permanent magnets may be placed strategically to draw the magnetically alignable particles or pigments to a specific location, into a specific orientation, or both. An image may be formed by engraving the magnetic material which may change the magnetic strength of the magnet in the engraved area. An image may be formed by using a masking material, which may block the magnetic field, between the magnetic layer and the magnetically alignable pigment. Combinations of fixed magnets may be employed to form a wide variety of three dimensional patterns when the liquid medium is in its equilibrium state. These images, logos or patterns are disturbed by an applied external force but reform after a given relaxation time when the external force is removed. In one embodiment the magnetic layer comprises both permanent magnets and a magnetic coating.

The piezochromic device may be used for a wide variety of applications. Examples include applications designed for decorative or security features. The use of pressure sensitive logos in the form of films or shrink sleeves can be ideal for next generation packaging design. In addition, the device may be used as an overt security feature to protect sensitive documents or finished goods from unwarranted handling or forgery.

The piezochromic device may also be used as a reversible pressure sensor. One example includes a pressure sensitive film to indicate sudden changes in pressure. This could be useful, for example, as a direct indicator for boundaries used on a sports court (a tennis court, for instance) or field where it is difficult to determine whether or not an object came into contact with the boundary. Another example would be the use of this device to indicate slight pressure variations within a flexible object, such as beverage container.

The piezochromic device may be used as a reminder, such as when a drug needs to be dispensed on a regular schedule, but not more often. Pressure on the device may dispense a drug while simultaneously disturbing the magnetically aligned pigments. After a predetermined time the magnetically aligned pigments will have returned to their equilibrium state. While the pigments are not in the equilibrium state it will be evident that the drug has been dispensed within the predetermined time and should not be dispensed again until after the pigments have returned to their equilibrium state.

While the present disclosure has illustrated by description several embodiments and while the illustrative embodiments have been described in considerable detail, it is not the intention of the applicant to restrict or in any way limit the scope of the appended claims to such detail. Additional advantages and modifications may readily appear to those skilled in the art.

EXAMPLES

Example 1

Piezochromic Device Based on Magnetic Alignment

Demonstration of a piezochromic device based on magnetic alignment was achieved using a modular design comprised of a stacked series of films as depicted in FIG. 1. Preparation began by cutting two 25 mm by 38 mm rectangular pieces of magnetic sheet (e.g. ProMAG® Adhes-A-MAG™, 12382). On one of the magnetic rectangles (the face not containing adhesive), is placed a length of double-faced tape (Shurtape DF 65). A hole was punched about 8 mm in diameter through the magnetic rectangle with the double-faced tape attached. The appropriate spacer material was cut to a square (e.g. PETE, polyethylene, polypropylene, fiberboard, or cardstock, etc.) with dimensions about 12 mm by 12 mm. This magnetic rectangle need not have been a magnetic material.

The square spacer material was placed onto the whole magnetic piece, and centered (more than one type of piece of spacer may be used with the multiple layers stacked so that the desired thickness is achieved). The backing paper on the magnetic sheet with the hole was removed and secured to the solid magnetic sheet and spacers so that the spacer formed the bottom of a well with the edges sealed via the adhesive backing (see FIG. 1).

The shallow well (thickness of well=thickness of the magnetic sheet) was filled with a suspension consisting of 2 wt % magnetic pigment (e.g. SunGEM™ 290-7203, SunChemical) in polydimethylsiloxane (Clearco Products Co., 100,000 cSt). The well was filled with approximately 28 mg of the suspension. The backing of the double faced tape was then removed and a piece of clear vinyl sheet affixed to the adhesive, as a cover layer. The sheet was affixed with care to prevent any significant quantities of air being trapped inside the well.

After approximately 45 minutes, the magnetically alignable particles contained within the suspension aligned along the magnetic field lines established by the magnetic sheet creating a well defined three dimensional image.

The piezochromic response was initiated by application of a 10 N/cm$^2$ force for 6 seconds in the direction normal to the shallow well containing the suspension. Immediately following removal of the applied external force, the image was completely disturbed resulting in a solid silver pearlescent appearance, for example that characteristic of SunGEM™ 290-7203.

During a period of about 45 minutes, the visible portion of the device converted from the solid silver pearlescent appearance back to the well defined three dimensional image induced by the magnetic field lines (as shown in FIG. 2).

The time periods required to obtain changes in appearance as described in the above example, can be significantly altered based on the types of materials and configuration used in the inventive device. Thus, the time to affect appearance change can range from milliseconds to minutes, or even hours, days, months or years if so desired. In another embodiment, the device could be configured such that a permanent change of appearance is affected as this may be useful as a security feature to show evidence of unwarranted handling. It is also possible that the device could be configured so as to reflect a precise amount of time elapsed after the force was initially applied.

The piezochromic device may be used for a wide variety of applications. Examples include applications for toys, games, timing devices, equipment assembly tolerance indicators, decorative, safety or security features. The use of pressure sensitive devices in the form of films or shrink sleeves may be ideal for next generation packaging design. Piezochromic timing devices may also be used for consumer products and consumer packaging. The use of such a device can be incorporated into pharmaceutical or over-the counter medication packaging, such as bottles, tubes, jars, and lids for such packaging. Other pharmaceutical devices include injection pens for insulin and other medications as well as other drug delivery devices. In addition, the device may be used as an overt security feature to protect sensitive documents or finished goods from unwarranted handling or forgery. Other potential uses could be for decorative purposes, such as flooring, wall coverings or tiles, and other decorative surfaces. Examples of specific applications include tapes, such as sports tape for marking basketball or tennis courts or other sports arenas. Other examples are pharmaceutical & consumer packaging—wrappers, vial, boxes, bags (IV & others), inhalers, dispensers, blister packs, sprayers, tubing, pouches, where timing devices can be used to clearly identify when to apply or take a medication or product or to remove a cleaner or conditioner or dye from a surface or other application.

Those skilled in the art having the benefit of the teachings of the present invention as hereinabove set forth, can effect numerous modifications thereto. These modifications are to be construed as being encompassed within the scope of the present invention as set forth in the appended claims.

What is claimed is:

1. A device comprising a transparent or semi-transparent cover layer and a magnetic layer, wherein between the cover layer and the magnetic layer is a liquid medium containing magnetically alignable pigments, wherein the magnetic layer is a permanent magnet.

2. The device of claim 1, wherein the cover is flexible.

3. The device of claim 1, additionally comprising a backing layer between the liquid medium and the magnetic layer.

4. The device of claim 3, wherein the back is flexible.

5. The method of applying pressure to the device of claim 1, wherein the pressure disrupts the orientation of the pigments.

6. The method of claim 5, wherein the magnetic layer orients the magnetically alignable pigments.

7. A method for determining whether a certain amount of time has elapsed since an event, comprising the use of the process of claim 5; wherein the event is the application of pressure to the cover layer; wherein the liquid medium is sufficiently viscous to cause the pigments to reorient in the magnetic field of the magnetic layer, wherein the time elapsed since the event is determined by when the pigments have been fully reoriented in the magnetic field of the magnetic layer.

8. The method of claim 7, wherein viscosity of the liquid medium, the strength of the magnetic field, and the magnetic susceptibility of the pigment are chosen so the time passed since the event takes longer than one minute.

9. The device of claim 1, wherein the pigment comprises an iron oxide layer.

10. The device of claim 1, wherein the pigment is a pearlescent pigment.

11. The device of claim 1, wherein the shape of the pigment is platelet-like.

12. The device of claim 1, wherein the liquid medium is selected from the group consisting of silicone, hydrocarbon or mineral oils, poly-alpha-olefins, polyol esters, glycerols, and glycols.

13. The device of claim 1, wherein the pigment comprises iron oxide.

14. The device of claim 1, wherein the pigment has a magnetic mass susceptibility in the range of from about $0.1*10^{-5}$ m$^3$/kg to about $60*10^{-5}$ m$^3$/kg.

* * * * *